United States Patent [19]

Tada et al.

[11] Patent Number: 4,677,163

[45] Date of Patent: Jun. 30, 1987

[54] VINYL CHLORIDE RESIN COMPOSITION AND PROCESS FOR PRODUCTION THEREOF

[75] Inventors: Seiichi Tada; Yasuhisa Hosoai, both of Ichihara, Japan

[73] Assignee: Du Pont-Mitsui Polychemicals Co., Ltd., Tokyo, Japan

[21] Appl. No.: 795,662

[22] Filed: Nov. 6, 1985

[30] Foreign Application Priority Data

Nov. 8, 1984 [JP] Japan ............................... 59-235911

[51] Int. Cl.⁴ ..................... C08L 27/06; C08L 23/08; C08L 23/28
[52] U.S. Cl. .................................. 525/190; 525/192; 525/239
[58] Field of Search ....................................... 525/190

[56] References Cited

U.S. PATENT DOCUMENTS

| | | | |
|---|---|---|---|
| 3,283,035 | 11/1966 | Schnebelen | 525/222 |
| 3,780,140 | 12/1973 | Hammer | 528/392 |
| 4,137,382 | 1/1979 | Vetter | 525/190 |
| 4,489,193 | 12/1984 | Gaswami | 525/190 |

*Primary Examiner*—Carman J. Seccuro
*Attorney, Agent, or Firm*—Wenderoth, Lind & Ponack

[57] ABSTRACT

A vinyl chloride resin composition comprising
(A) 100 parts by weight of a vinyl chloride resin,
(B) 30 to 200 parts by weight of an ethylene/vinyl acetate/carbon monoxide copolymer, and
(C) 2 to 80 parts by weight of chlorinated polyethylene. The said vinyl chloride resin composition can be prepared by simultaneously melt-mixing 100 parts by weight of the vinyl chloride resin, 30 to 200 parts by weight of the ethylene/vinyl acetate/carbon monoxide copolymer and 2 to 80 parts by weight of chlorinated polyethylene.

3 Claims, No Drawings

VINYL CHLORIDE RESIN COMPOSITION AND PROCESS FOR PRODUCTION THEREOF

This invention relates to a vinyl chloride resin composition, and a process for production thereof. More specifically, it relates to a vinyl chloride resin having transparency and a reduced content of unmelted vinyl chloride resin particles, and a process for production thereof.

Generally, ethylenic polymers have poor compatibility with other polymers because they are non-polar. An ethylene/vinyl acetate/carbon monoxide copolymer, however, has good compatibility with polar group-containing polymers such as polyvinyl chloride, polyamides and cellulose derivatives because it has a highly polar carbon monoxide unit in the molecule (Japanese Patent Publication No. 50063/1980). The carbon monoxide copolymer is used as a permanent plasticizer or a modifier for vinyl chloride resin in place of the conventional liquid plasticizers.

The use of the carbon monoxide copolymer as a permanent plasticizer makes the most of its characteristic, and obviates the defects of conventional vinyl chloride resin compositions. For example, it does not cause changes in the rigidity of molded articles of the resin compositions by the volatilization or extraction of liquid plasticizers, nor does it cause pollution of other substrates by the migration of the liquid plasticizers. Accordingly, sheets molded from vinyl chloride resin compositions containing the carbon monoxide copolymer are used in fields in which the conventional vinyl chloride resin compositions are not satisfactorily used, for example as pond liners for industrial waste water reservoirs which require outdoor durability, and cover sheets for electrical appliances which require a high level of non-migration.

However, the carbon monoxide copolymer is a high-molecular-weight plasticizer which is solid at ordinary temperatures unlike the conventionally used liquid plasticizers. When a flexible vinyl chloride resin composition is to be prepared by adding a relatively large amount of the carbon monoxide copolymer, it is generally difficult to disperse the vinyl chloride resin uniformly during kneading and obtain a composition free from unmelted resin particles.

Kneading for the preparation of the vinyl chloride resin composition containing the carbon monoxide copolymer is carried out usually at high temperatures of more than 150° C. At such a kneading temperature, the carbon monoxide copolymer having a lower softening point is first melted and becomes a molten mass having a low viscosity, and particles of the vinyl chloride resin are suspended in the molten mass. Hence, the shearing force of a kneader required for melting and dispersing of the vinyl chloride resin cannot easily act on the resin particles. Consequently, the unmelted vinyl chloride resin particles tend to remain in the resulting composition. This tendency is most pronounced in the case of a homopolymer of vinyl chloride.

One recommended method for solving this problem is to use a batch-type kneader such as a two-roll mill or Banbury mixer, and to add a predetermined amount of the carbon monoxide copolymer not all at once but successively in portions. This method, however, has the following problems when it is viewed as an actual production process in a plant.

(1) It is the usual practice in the preparation of the vinyl chloride resin composition to feed all the pre-weighed components into a pre-mixing device such as a Henschel mixer or a ribbon blender, mix them with stirring at room temperature or at an elevated temperature to form a dry blend, and then put a suitable amount of the dry blend in a two-roll mill, a Henschel mixer, etc. and knead the blend. However, when the carbon monoxide copolymer is to be added successively, it is necessary to first dry blend the components other than the carbon monoxide copolymer, separately weighing the dry blend and the carbon monoxide copolymer before the kneading step, and then feed them to the kneading step. Accordingly, it is more complex than the ordinary method of preparing a vinyl chloride resin composition.

(2) The carbon monoxide copolymer melt-adheres to the vicinity of the feed inlet of the Banbury mixer heated with steam, etc.

It is an object of this invention to provide a vinyl chloride resin composition having a novel chemical composition.

Another object of this invention is to provide a vinyl chloride resin composition having transparency and a reduced content of unmelted vinyl chloride resin particles.

Still another object of this invention is to provide a novel three-component resin composition which is relatively flexible and has transparency like a known two-component resin composition comprising a vinyl chloride resin and an ethylene/vinyl acetate/carbon monoxide copolymer.

Yet another object of this invention is to provide a three-component resin composition having better transparency than a known two-component resin composition comprising a vinyl chloride resin and chlorinated polyethylene.

A further object of this invention is to provide an industrially advantageous process for producing the resin composition of the invention by kneading predetermined amounts of three resin components at a time.

Other objects of this invention will become apparent from the following description.

According to the invention, the above objects and advantages are achieved by a vinyl chloride resin composition comprising 100 parts by weight of (A) a vinyl chloride resin, 30 to 200 parts by weight of (B) an ethylene/vinyl acetate/carbon monoxide copolymer, and 2 to 80 parts by weight of (C) chlorinated polyethylene. Examples of the vinyl chloride resin (A) used in this invention include not only a homopolymer of vinyl chloride but also copolymers of vinyl chloride with other monomers, for example alpha-olefins such as ethylene and propylene, and other vinyl compounds or vinylidene compounds such as vinyl acetate, acrylic acid esters, alkyl vinyl ethers, vinyl bromide, vinyl fluoride, vinylidene chloride, styrene and acrylonitrile.

The ethylene/vinyl acetate/carbon monooxide copolymer (B) used is generally one composed of about 40 to 80%, preferably about 60 to 70%, by weight of ethylene, about 15 to 60%, preferably about 20 to 35%, by weight of vinyl acetate, and about 5 to 30%, preferably about 5 to 15%, by weight of carbon monoxide. Such a copolymer may, as required, have another comonomer copolymerized therewith.

The chlorinated polyethylene (C) may be one derived from high-density polyethylene or low-density polyethylene. Advantageously, the chlorinated polyethylene has a chlorine content of preferably about 30 to 50% by weight, more preferably about 35 to 45% by weight. Preferably the chlorinated polyethylene has a crystallinity of not more than 10%. The chlorinated polyethylene is commercially available. For example, DAISO-LAC (a product of Osaka Soda Co., Ltd.), and ELASLEN (a product of Showa Denko Co., Ltd.) are advantageously used.

The resin composition of this invention comprises 100 parts by weight of the vinyl chloride resin (A), 30 to 200 parts by weight, preferably 50 to 150 parts by weight, of the ethylene/vinyl acetate/carbon monoxide copolymer (B), and 2 to 80 parts by weight, preferably 2.5 to 60 parts by weight, of the chlorinated polyethylene (C). It is known that the ethylene/vinyl acetate/carbon monoxide copolymer and the chlorinated polyethylene can singly be used as a plasticizer for vinyl chloride resins. The composition of this invention may include a known liquid plasticizer for vinyl chloride resins in an amount not exceeding the amount of the carbon monoxide copolymer under such conditions that the copolymer and the chlorinated polyethylene are maintained in the predetermined amounts. The use of a larger proportion of the liquid plasticizer will lead to a deterioration in the durability and oil resistance of the resulting composition owing to the migration, volatilization or extraction of the plasticizer.

The chlorinated polyethylene is used in the composition of this invention to improve the kneading characteristics of the vinyl chloride resin and the ethylene/vinyl acetate/carbon monoxide copolymer while retaining the desired feel of the final composition rather than to function as a plasticizer.

If the amount of the chlorinated polyethylene is smaller than the above-specified lower limit, the number of unmelted particles cannot easily be reduced to the desired degree. On the other hand, if the chlorinated polyethylene is used in a proportion exceeding the above-specified upper limit, the compatibility of the chlorinated polyethylene with the vinyl chloride resin or its plasticizing ability is inferior to that of the carbon monoxide copolymer. Consequently, the transparency of the resulting copolymer is reduced or its feel becomes hard. Thus, a soft composition cannot be obtained.

The composition of this invention can be produced by melt-mixing predetermined amounts of the three components (A), (B) and (C) successively or simultaneously.

The present invention offers a great industrial advantage in that by melt-mixing the three components (A), (B) and (C) simultaneously, the compositon of this invention having transparency and containing a reduced number of unmelted vinyl chloride resin particles can be obtained.

Accordingly, the present invention provides a process for producing the composition of this invention which comprises simultaneously melt-mixing 100 parts of the vinyl chloride resin, 30 to 200 parts by weight of the ethylene/vinyl acetate/carbon monoxide copolymer and 2 to 80 parts by weight of the chlorinated polyethylene.

The process of this invention can be practiced by using a kneader such as a two-roll mill or a Banbury mixer. When the three components are to be successively mixed, the process can also be practiced by using a continuous kneader such as a twin-screw extruder or a FARREL continuous mixer. In any case, the operation itself of kneading may be nearly the same as that used in preparing ordinary vinyl chloride compositions.

Since the presence of chlorinated polyethylene leads to the high melt viscosity of the composition during high-temperature kneading, the shearing force of kneading easily acts on the vinyl chloride resin particles so that the vinyl chloride resin is melted and dispersed easily. This is considered to be the reason why in the preparation of the vinyl chloride resin composition of this invention, the number of unmelted particles can be reduced.

Since the carbon monoxide copolymer can be added all at once, the operability in the preparation of the composition of this invention is greatly improved. Moreover, since all the components can be fed all at once into the kneader, the carbon monoxide copolymer pellets are covered with the other components, and the melting of this copolymer in the vicinity of the feed inlet of the kneader is prevented, and no contamination of the vicinity of the feed inlet occurs.

The following examples illustrate the present invention. All parts in these examples are by weight.

EXAMPLES 1-5 AND COMPARATIVE EXAMPLE 1

A dry blend was prepared by mixing 100 parts of a vinyl chloride resin (VINYCHLON 2000M, average degeee of polymerization 1000; a product of Mitsui Toatsu Chemicals, Inc.), an ethylene/vinyl acetate/carbon monoxide copolymer (vinyl chloride content 28.5%; carbon monoxide content 9%, MI 35) in the amount indicated in Table 1, chlorinated polyethylene (DAISOLAC, a product of Osaka Soda Co., Ltd.) in the amount indicated in Table 1, 2.5 parts of a Ba-Zn type stabilizer, 0.5 part of a phosphite ester, 5 parts of epoxidized soybean oil, and 2.0 parts of polyethylene wax (Allied AC-617C, a product of Allied Chemical Corporation).

The dry blend (150 g) was fed all at once to a 6-inch roll whose surface temperature was kept at 165° to 170° C., and kneaded for 10 minutes. The resulting sheet of the vinyl chloride resin composition was tested and evaluated as indicated below, and the results are shown in Table 1.

Number of unmelted particles

A hot press sheet having a thickness of about 200 micrometers was prepared from the resulting sheet. The unmelted vinyl chloride resin particles contained in the press sheet was projected at a magnification of 10 on a screen of a Nikon profile projector (Model 60). The number of the particles was counted and converted to the number of particles contained per $cm^2$. This number is defined as the number of unmelted particles. The number of unmelted particles desired for practical application is not more than 100/$cm^2$.

Hardness

A load was applied to a 3 mm press sheet in accordance with JIS K-6301, and the hardness of the sheet after 15 seconds was measured.

Transparency

The transparency of 1 mm-thick press sheet was visually evaluated. The transparency depends upon the proportion of the chlorinated polyethylene, the thickness of the film, etc.

TABLE 1

|  | Example 1 | Example 2 | Example 3 | Example 4 | Example 5 | Comparative Example 1 |
| --- | --- | --- | --- | --- | --- | --- |
| Carbon monoxide copolymer (parts) | 60 | 50 | 40 | 50 | 50 | 70 |
| Chlorinated polyethylene (parts) | | | | | | |
| DAISOLAC G-235 | 10 | 20 | 30 | — | — | — |
| DAISOLAC H-135 | — | — | — | 20 | — | — |
| DAISOLAC G-245 | — | — | — | — | 20 | — |
| Number of unmelted particles (per cm$^2$) | 120 | 65 | 40 | 29 | 90 | 1240 |
| Hardness (JIS A) | 94 | 96 | 98 | 95 | 97 | 91 |
| Transparency | transparent | slightly turbid whitely | turbid whitely | slightly turbid whitely | slightly turbid whitely | transparent |

The above results demonstrate that in the composition of this invention, the number of unmelted particles is reduced greatly to a level acceptable for practical application as compared with Comparative Example 1 in which the carbon monoxide copolymer was added all at once without using chlorinated polyethylene, and that the composition of this invention retains nearly the same hardness as in Comparative Example 1 and still had transparency.

EXAMPLES 6-8 AND COMPARATIVE EXAMPLE 2

Dry blends were prepared in accordance with Examples 1 to 3 except that the amounts of the carbon monoxide copolymer and chlorinated polyethylene were varied as in Table 2. 1.5 kg of each of the dry blends was fed all at once into a small-sized Banbury mixer (inner capacity 1.8 liters; jacket 3 kg-G/cm$^2$ steam) and kneaded for 4 minutes while rotating the rotor at a speed of 60 rpm. Immediately after discharge from the Banbury mixer, the vinyl chloride resin composition had a temperature of 180° to 185° C. The resulting vinyl chloride resin composition was tested and evaluated in the same way as in Examples 1 to 5, and the results are shown in Table 2.

TABLE 2

|  | Example 6 | Example 7 | Example 8 | Comparative Example 2 |
| --- | --- | --- | --- | --- |
| Carbon monoxide copolymer (parts) | 90 | 80 | 50 | 100 |
| Chlorinated polyethylene (parts) | 10 | 20 | 50 | — |
| Number of unmelted particles (per cm$^2$) | 40 | 10 | 2 | 1320 |
| Hardness (JIS A) | 82 | 83 | 86 | 80 |
| Transparency | transparent | slightly turbid whitely | whitely turbid | transparent |

What is claimed is:

1. A substantially transparent vinyl chloride resin composition comprising
   (A) 100 parts by weight of a vinyl chloride resin,
   (B) 30 to 200 parts by weight of an ethylene/vinyl acetate/carbon monoxide copolymer, and
   (C) 2 to 50 parts by weight of chlorinated polyethylene, provided that the amount of said chlorinated polyethylene is not more than 25 parts by weight per 100 parts by weight of said ethylene/vinyl acetate/carbon monoxide copolymer.

2. A composition according to claim 1 which comprises 100 parts by weight of the vinyl chloride resin, 50 to 150 parts by weight of the ethylene/vinyl acetate/carbon monoxide copolymer, and 2.5 to 37.5 parts by weight of chlorinated polyethylene.

3. A process for producing a substantailly transparent vinyl chloride resin composition of claim 1, which comprises simultaneously melt-mixing 100 parts by weight of the vinyl chloride resin, 30 to 200 parts by weight of the ethylene/vinyl acetate/carbon monoxide copolymer and 2 to 50 parts by weight of chlorinated polyethylene, provided that the amount of said chlorinated polyethylene is not more than 25 parts by weight per 100 parts by weight of said ethylene/vinyl acetate/carbon monoxide copolymer.

* * * * *